(12) United States Patent
Viereck et al.

(10) Patent No.: US 10,061,310 B2
(45) Date of Patent: Aug. 28, 2018

(54) METHOD FOR THE CONTROL OF AN INDUSTRIAL TRUCK DURING ORDER PICKING

(71) Applicant: Still GmbH, Hamburg (DE)

(72) Inventors: Volker Viereck, Kuhsen (DE); Tino Krüger-Basjmeleh, Halstenbek (DE); Thomas Wittmann, Hamburg (DE); Christian Fischer, Boostedt (DE)

(73) Assignee: STILL GmbH, Hamburg (DE)

( * ) Notice: Subject to any disclaimer, the term of this patent is extended or adjusted under 35 U.S.C. 154(b) by 0 days.

(21) Appl. No.: 15/450,386

(22) Filed: Mar. 6, 2017

(65) Prior Publication Data

US 2017/0255196 A1 Sep. 7, 2017

(30) Foreign Application Priority Data

Mar. 7, 2016 (DE) .................. 10 2016 104 089

(51) Int. Cl.
| | |
|---|---|
| *G05D 1/00* | (2006.01) |
| *B66F 9/075* | (2006.01) |
| *B65G 1/137* | (2006.01) |
| *G05B 19/418* | (2006.01) |
| *B66F 9/06* | (2006.01) |

(52) U.S. Cl.
CPC ......... *G05D 1/0016* (2013.01); *B65G 1/1373* (2013.01); *B66F 9/063* (2013.01); *B66F 9/0755* (2013.01); *B66F 9/07581* (2013.01); *G05B 19/41895* (2013.01); *G05D 2201/0216* (2013.01)

(58) Field of Classification Search
CPC .......................... B66F 9/0755; G05D 1/0016
See application file for complete search history.

(56) References Cited

U.S. PATENT DOCUMENTS

| 8,634,981 | B1* | 1/2014 | Hyde | A61G 1/0275 |
| | | | | 180/19.1 |
| 9,008,860 | B2* | 4/2015 | Waldock | G05D 1/0044 |
| | | | | 340/4.61 |
| 9,354,070 | B2* | 5/2016 | Thomson | B66F 9/063 |
| 9,522,817 | B2* | 12/2016 | Castaneda | B66F 9/07581 |
| 9,533,864 | B2* | 1/2017 | Peterson | B66F 17/003 |
| 2003/0197351 | A1* | 10/2003 | Burger | B62B 3/0612 |
| | | | | 280/651 |
| 2009/0076664 | A1* | 3/2009 | McCabe | B60L 3/02 |
| | | | | 701/2 |
| 2017/0017392 | A1* | 1/2017 | Castaneda | G06F 3/0488 |

(Continued)

FOREIGN PATENT DOCUMENTS

| EP | 2851331 A1 | 3/2015 |
| FR | 2980436 A1 | 3/2013 |

*Primary Examiner* — Thomas Randazzo
(74) *Attorney, Agent, or Firm* — The Webb Law Firm

(57) ABSTRACT

A method for the control of an industrial truck during order picking by an industrial truck with at least one environment sensor for the detection of the relative position of an operator in the environment of the industrial truck. The method includes moving the industrial truck using a control system. As the position of the operator changes, and when the operator stops, the industrial truck is stopped at a freely selectable distance specified in advance in the longitudinal direction of the vehicle between a reference point of a load handling device of the industrial truck and the position of the operator.

7 Claims, 1 Drawing Sheet

(56) References Cited

U.S. PATENT DOCUMENTS

2017/0088355 A1* 3/2017 Khodl .................. B65G 1/1375
2017/0174490 A1* 6/2017 Swift ..................... B60Q 5/005
2017/0192428 A1* 7/2017 Vogt ..................... G05D 1/0038
2017/0269608 A1* 9/2017 Chandrasekar ...... G01C 21/206

* cited by examiner

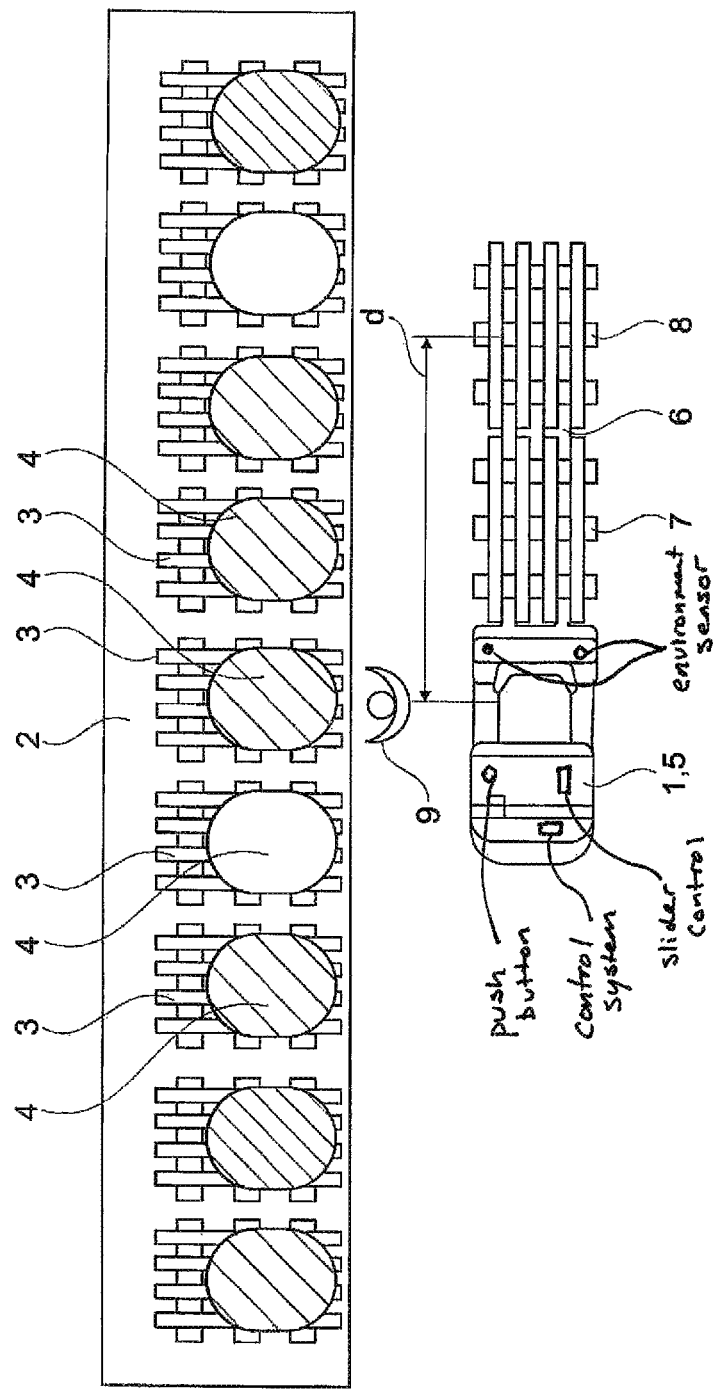

METHOD FOR THE CONTROL OF AN INDUSTRIAL TRUCK DURING ORDER PICKING

CROSS REFERENCE TO RELATED APPLICATIONS

This application claims priority to German Patent Application No. DE 10 2016 104 089.4, filed Mar. 7, 2016, the disclosure of which is hereby incorporated by reference in its entirety.

BACKGROUND OF THE INVENTION

Field of the Invention

This invention relates to a method for the control of an industrial truck during order picking. The invention relates, in particular, to a method for the control of an industrial truck during order picking using an industrial truck that has at least one environment sensor to detect the relative position of an operator in the environment of the industrial truck.

Description of Related Art

On industrial trucks, in particular warehouse trucks that are designed to be used for order picking, the prior art includes generic walking pallet trucks, where the operator walks next to the vehicle, such as a pallet lift truck. The prior art also includes vehicles that have a driver's workplace to carry the driver. During the order picking itself, it is easy for the driver to leave this driver's workplace to pick up goods and, for example, place them on a pallet on a load fork.

For industrial trucks of this type, optical environmental sensors are known which detect the environment of the industrial truck. These sensors can be, for example, two-dimensional laser scanners (2-D laser scanners) or even three-dimensional laser scanners (3-D laser scanners), as well as optical sensors that measure distances, such as a time-of-flight camera. Using environmental sensors of this type, obstacles in the environment, roadways, positions of pallets as well as, in particular on order picker industrial trucks, the position of the industrial truck relative to a load shelf can be detected. For example, a laser scanner that measures the environment orthogonally to a mirror axis of rotation can be used for this purpose.

It is also known that to facilitate order picking, a warehouse truck or industrial truck can be moved by remote control, for example, by pushing a button on a remote control unit, in response to which the industrial truck continues to move as long as this signal continues to be transmitted. The industrial truck reacts automatically by means of the optical environmental sensors to changing distances from the load shelf, and automatically avoids obstacles as it travels. The industrial truck automatically maintains the proper distance from each side of the aisle between the load shelves.

One disadvantage of this method is that the industrial truck is positioned exactly as it is remotely controlled by the operator. For example, the forward travel of the industrial truck is interrupted at the instant the operator releases the forward button on a remote control unit. Therefore, it is left exclusively up to the operator to position the truck optimally or at the smallest possible distance between the position of an item to be picked and the point on the industrial truck where it is to be deposited. As a result of the requirement that the operator is the only one who can exercise this control, the operator must concentrate entirely on forward travel to the next order picking position. Therefore, the operator is holding the remote control unit in his hand and his hand is not free to pick up the next item. If, for example, an order picking truck with a long load fork is to be positioned for two pallets, the operator must drive individually to each of the positions to load a forward pallet or a rear pallet.

SUMMARY OF THE INVENTION

The object of this invention is to make available a method for the control of an industrial truck for order picking that eliminates the disadvantages described above and which makes possible easier operation and a faster turnover of goods.

This object is achieved by a method for the control of an industrial truck during order picking with the features described in the following disclosure. Advantageous developments of the invention are described in the following disclosure.

The invention teaches a method for the control of an industrial truck during order picking using an industrial truck with at least one environment sensor for the detection of the relative position of an operator in the vicinity of the industrial truck. A control system, e.g., a control system (electronic control unit) of the industrial truck, moves the industrial truck when the position of the operator changes. When the operator stops, the industrial truck is stopped by the control system at a defined distance that is freely selectable in advance, in the longitudinal direction of the vehicle between a reference point of a load handling device of the industrial truck and the position of the operator.

The control system thereby executes a continuous control algorithm and controls the traction drive of the industrial truck so that the position of the operator and of the industrial truck are continuously and/or progressively adjusted relative to each other. The advantageous result is improved ergonomics, because the operator no longer has to bother with controlling the stopping position of the industrial truck. The control system is optimally adapted to the order picking process. The distance can, therefore, be input freely and individually in advance by the driver, depending on what the driver wants. The distance thereby relates to a reference point of the load handling device of the industrial truck which can mean the center of a pallet position on the load handling device of the industrial truck and/or the forward edge of the vehicle or the forward edge of a load fork as the load handling device of the industrial truck. For the operator, during order picking, the result is short or specified distances between the items to be picked and the position in which they are to be deposited on the industrial truck. In particular, when driving to the next position, the operator can advantageously select a good stopping point for the next item to be picked up, leave an industrial truck equipped with a driver's workplace and grab the item even while the industrial truck is simultaneously and automatically moving into the desired, optimal position relative to the operator.

The control system can stop the industrial truck at a freely selectable distance that can be specified in the transverse direction of the vehicle between a reference point of the load handling device of the industrial truck and the position of the operator.

Consequently, the lateral distance from the operator can also be optimized, in which the operator can stop in front of a shelf, pick up an item, and as he turns around and places it on the industrial truck, the industrial truck is already at the desired optimal lateral distance.

The distance in the longitudinal direction of the industrial truck and/or the distance in the transverse direction of the industrial truck can be set by the operator by means of a slider control.

A setting of this type is intuitive and can be provided on the industrial truck. Likewise, it is also conceivable that a slider control of this type can be integrated into a remote control unit.

A target corridor can be input with a maximum tolerance from the stopping position, and after the industrial truck has reached the target corridor, no further position correction is performed.

Therefore, a certain tolerance range can be defined within which no further position correction is made. That makes it possible to stop the industrial truck more rapidly.

The industrial truck can advantageously transport two or more pallets on the load handling device, one behind the other in the longitudinal direction, and distances for the individual pallets can be selected, in particular, by a push button.

In particular, on order picker trucks with long load forks that transport two pallets, one behind the other, a simple and fast change between a set-down position on the first or second pallet can be achieved.

In one development of the method, the industrial truck is a tow-tractor for a tugger train and distances for the individual trailers of the tugger train can be selected.

The industrial truck can have a driver's workplace and the control method can be initiated as soon as a control system detects, by means of driver detection sensors, that the driver has left the workplace.

Additional advantages and details of the invention are explained below with reference to the exemplary embodiment illustrated in the accompanying drawing.

BRIEF DESCRIPTION OF THE DRAWING

FIG. 1 is a schematic illustration of the industrial truck and control system according to an aspect of the present disclosure.

DESCRIPTION OF THE INVENTION

FIG. 1 shows an industrial truck 1 next to a load shelf 2 with a plurality of pallets 3, and items 4 located on each of the pallets 3. The industrial truck is a pallet lift truck 5 with long load arms 6 on which a first pallet 7 and a second pallet 8 can be transported during order picking. In the illustrated situation, the industrial truck 1 is stopping, and according to the method, a control system of the industrial truck stops the industrial truck with reference to the center of the second pallet 8 at a longitudinal distance d from an operator 9. When the operator 9 has picked up an item and turned toward the industrial truck 1, he is at the specified distance from the first pallet 7 known as the load set-down position. By means of a switch (not shown), the operator can choose between a distance d for the first pallet 7 or an appropriate distance for the second pallet 8.

Although the invention has been described in detail for the purpose of illustration based on what is currently considered to be the most practical and preferred aspects, it is to be understood that such detail is solely for that purpose and that the invention is not limited to the disclosed aspects, but, on the contrary, is intended to cover modifications and equivalent arrangements that are within the spirit and scope of the appended claims. For example, it is to be understood that the present invention contemplates that, to the extent possible, one or more features of any aspect can be combined with one or more features of any other aspect.

The invention claimed is:

1. A method for control of an industrial truck during order picking by the industrial truck with at least one environment sensor for the detection of a relative position of an operator in an environment of the industrial truck, the method comprising the steps of:
moving the industrial truck using a control system as a position of the operator changes; and
when the operator stops, stopping the industrial truck at a freely selectable distance specified in advance in a longitudinal direction of the industrial truck between a reference point of a load handling device of the industrial truck and the position of the operator,
wherein the industrial truck transports two or more pallets on the load handling device, one pallet behind the other pallet in the longitudinal direction, and a freely selectable distance for each individual pallet is specifiable in advance in the longitudinal direction of the industrial truck between the individual pallet and the position of the operator such that the control system is configured to stop the industrial truck at multiple freely selectable distances from the operator based on the selected pallet.

2. The method as recited in claim 1, wherein the control system stops the industrial truck at a freely selectable distance specified in advance in a transverse direction of the industrial truck between the reference point of the load handling device of the industrial truck and the position of the operator.

3. The method as recited in claim 1, wherein the freely selectable distance in the longitudinal direction of the vehicle from the operator, the freely selectable distance in the transverse direction of the vehicle from the operator, or the freely selectable distance in the longitudinal direction of the vehicle from the operator and the freely selectable distance in the transverse direction of the vehicle from the operator is set by a slider control.

4. The method as recited in claim 1, wherein a target corridor is input with a maximum tolerance from a stopping position so that, after the industrial truck has reached the target corridor, no position correction is performed.

5. The method as recited in claim 1, wherein the distances are selected by a push button.

6. The method as recited in claim 1, wherein the industrial truck is a tow tractor for a tugger train, and distances for individual trailers of the tugger train are selected.

7. The method as recited in claim 1, wherein the industrial truck has a driver's workplace and the method is initiated as soon as the control system detects, using driver detection sensors, that the operator has left the driver's workplace.

* * * * *